United States Patent
Iwanski et al.

(10) Patent No.: US 7,739,726 B2
(45) Date of Patent: Jun. 15, 2010

(54) PORTABLE DEVICE FOR ACCESSING HOST COMPUTER VIA REMOTE COMPUTER

(75) Inventors: Jerry S. Iwanski, Hamilton (CA); K. Andrew White, Toronto (CA)

(73) Assignee: Route1 Inc., Toronto, Ontario (CA)

( * ) Notice: Subject to any disclaimer, the term of this patent is extended or adjusted under 35 U.S.C. 154(b) by 1121 days.

(21) Appl. No.: 11/273,173

(22) Filed: Nov. 14, 2005

(65) Prior Publication Data

US 2007/0113267 A1    May 17, 2007

(51) Int. Cl.
G06F 15/16    (2006.01)
G06F 21/00    (2006.01)

(52) U.S. Cl. .......................................... 726/9; 713/185
(58) Field of Classification Search ....................... 726/2
See application file for complete search history.

(56) References Cited

U.S. PATENT DOCUMENTS

| | | | |
|---|---|---|---|
| 6,449,651 B1 * | 9/2002 | Dorfman et al. | 709/229 |
| 6,611,869 B1 | 8/2003 | Eschelbeck | |
| 6,895,502 B1 | 5/2005 | Fraser | |
| 2002/0038420 A1 * | 3/2002 | Collins et al. | 713/156 |
| 2002/0112183 A1 * | 8/2002 | Baird et al. | 713/201 |
| 2003/0182571 A1 * | 9/2003 | Hashimoto et al. | 713/194 |
| 2003/0217123 A1 | 11/2003 | Anderson | |
| 2004/0070952 A1 * | 4/2004 | Higuchi et al. | 361/737 |
| 2005/0091308 A1 * | 4/2005 | Bookman et al. | 709/203 |
| 2005/0120204 A1 | 6/2005 | Kiwimagi | |
| 2005/0144133 A1 | 6/2005 | Hoffman | |
| 2006/0253894 A1 * | 11/2006 | Bookman et al. | 726/2 |

OTHER PUBLICATIONS

IBM Technical Disclosure Bulletin, vol. 36, No. 3, Mar. 1993, New York, U.S., pp. 421-425, XP000354831: "Remote Desktop Environments Reflected in Local Desktop Windows".*
Citrix. 2004. White Paper: Remote-Access Technologies: A Comparison of GoToMyPC™ and pcAnywhere™.*

* cited by examiner

Primary Examiner—Brandon S Hoffman
(74) Attorney, Agent, or Firm—Brenda Pomerance

(57) ABSTRACT

A portable device enables access to a host computer via a guest computer. The portable device is connected to the guest computer, and a program stored in a memory on the portable device is activated, the program including instructions for establishing communication with the host computer such that input to the guest computer serves as input to the host computer, and output displays from the host computer are displayed on the guest computer. The portable device includes a cryptographic processor for performing cryptographic processing for communicating with the host computer. The portable device also includes a protected memory for storing a private key accessible to the cryptographic processor, the private key being used during cryptographic processing. The protected memory can be internal or external to the cryptographic processor.

20 Claims, 4 Drawing Sheets

PORTABLE DEVICE FOR ACCESSING HOST COMPUTER VIA REMOTE COMPUTER

BACKGROUND OF THE INVENTION

The present invention relates to a portable device that can be inserted into a remote computer to enable access to a host computer's capabilities.

So-called memory sticks are in widespread use. These memory sticks are small, portable devices that can be inserted into an external port of a personal computer. FIG. 1 shows memory stick 10 having read/write memory 11 coupled to USB controller 12 that is coupled to USB connector 13. Typically, memory 11 is a chip attached to a small printed circuit board, and controller 12 comprises circuitry on the chip, or sometimes a separate chip attached to the printed circuit board. When memory stick 10 is placed in the USB port of a computer, the operating system detects a new device, and executes a "new device found" routine that typically displays the files stored on memory stick 10.

Variations of the memory stick include devices having a fingerprint reader, devices having an MP3 music player, devices having a small disk drive in addition to or instead of a read/write memory, and so on.

For users that travel, it is desirable to provide such mobile users with access to their data and computer functions, from anywhere. Accordingly, it is desirable that a user be able to access their data and computer functions from any computer via the convenience of a memory stick type of device.

SUMMARY OF THE INVENTION

In accordance with an aspect of this invention, there are provided a method of and a portable device for enabling access to a host computer via a guest computer. The portable device is connected to the guest computer, and a program stored in a memory on the portable device is activated, the program including instructions for establishing communication with the host computer such that input to the guest computer serves as input to the host computer, and output displays from the host computer are displayed on the guest computer.

According to a further aspect of the invention, the stored program includes instructions for coupling the guest computer to a communication network, communicating with a controller coupled to the communication network to obtain parameters, and using the obtained parameters to communicate with the host computer coupled to the communication network.

The portable device includes a cryptographic processor for performing cryptographic processing for communicating with the host computer. The portable device also includes a protected memory for storing a private key accessible to the cryptographic processor, the private key being used during cryptographic processing. The protected memory can be internal or external to the cryptographic processor.

The portable device may also include biometric input means for receiving a biometric sample from a user, biometric authentication means for determining whether the biometric sample is for an authorized user, and wherein the cryptographic processor is operative only when the biometric authentication means has determined that the biometric sample is for an authorized user.

The memory on the portable device is also for storing an operating system.

The cryptographic processing includes generating an identification certificate and a private key; sending and receiving handshake messages; and encrypting and decrypting transmissions between the guest computer and the host computer.

It is not intended that the invention be summarized here in its entirety. Rather, further features, aspects and advantages of the invention are set forth in or are apparent from the following description and drawings.

DETAILED DESCRIPTION

A small portable device includes an interface to an external computer port and memory for storing a program that enables access from any computer coupled to a communication network to a host computer. This device makes it convenient for a user to access the host computer. The device includes a cryptographic processor that performs cryptographic operations and protects the privacy of the software crypto-key stored therein. Since the device includes a cryptographic processor, the crypto-key never leaves the device, and thus its privacy is protected.

Figure 1:
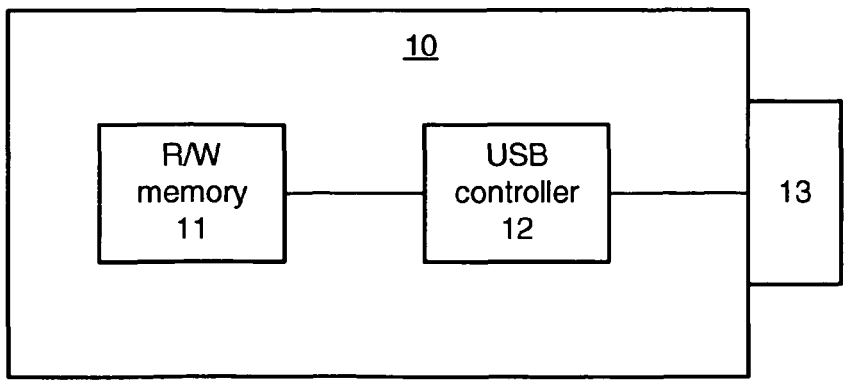
FIG. 1 is a diagram of a conventional memory stick.
Figure 2:
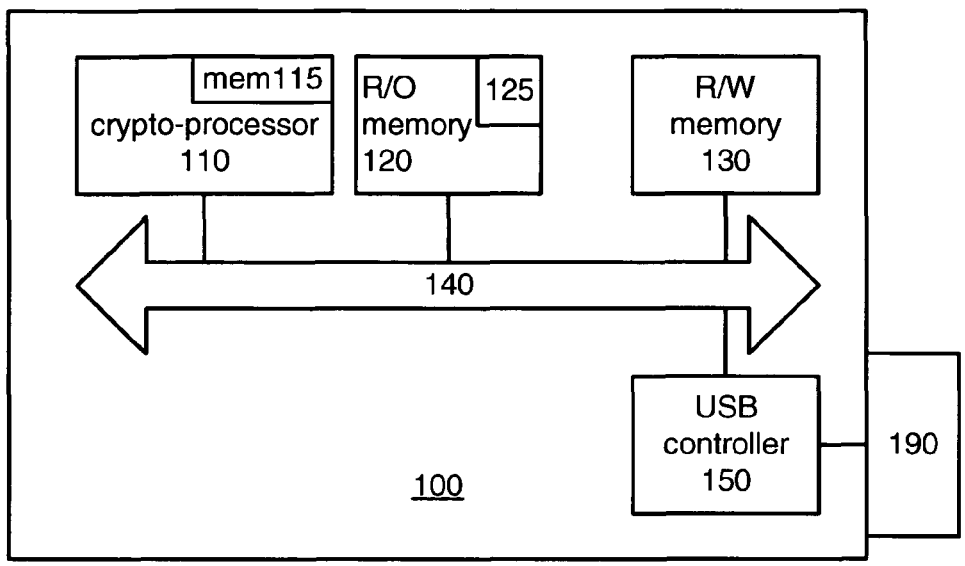
FIGS. 2 and 3 are diagrams of devices embodying the present invention.

FIG. 2 illustrates portable device 100 having cryptographic processor 110, read-only memory 120 containing program 125, read-write memory 130, communication bus 140, port controller 150 and connector 190. In one embodiment, connector 190 is a universal serial bus (USB) connector, and port controller 150 is a USB controller. Each of cryptographic processor 110, read-only memory 120, read-write memory 130 and controller 150 is coupled to bus 140. Controller 150 is also coupled to connector 190.

In another embodiment, connector 190 and port controller 150 are operative according to the multi-media card (MMC) standard explained at http://www.mmca.org. In a further embodiment, connector 190 and port controller 150 are operative according to the secure digital (SD) standard explained at www.sdcard.org. Other standards may instead be employed, such as a Sony memory stick standard.

Cryptographic processor 110 includes protected memory 115. Protected memory 115 is a flash-type memory can be written only when a special administrator-write password is provided, typically, during registration. Protected memory 115 serves to store a private crypto-key accessible only to cryptographic processor 110. The contents of protected memory 115 are read-protected with a secret user credential. Cryptographic processor 110 provides the secret user credential as authentication, enabling access to protected memory 115. The contents of protected memory 115 cannot be extracted from cryptographic processor 110 by a user.

Figure 3:
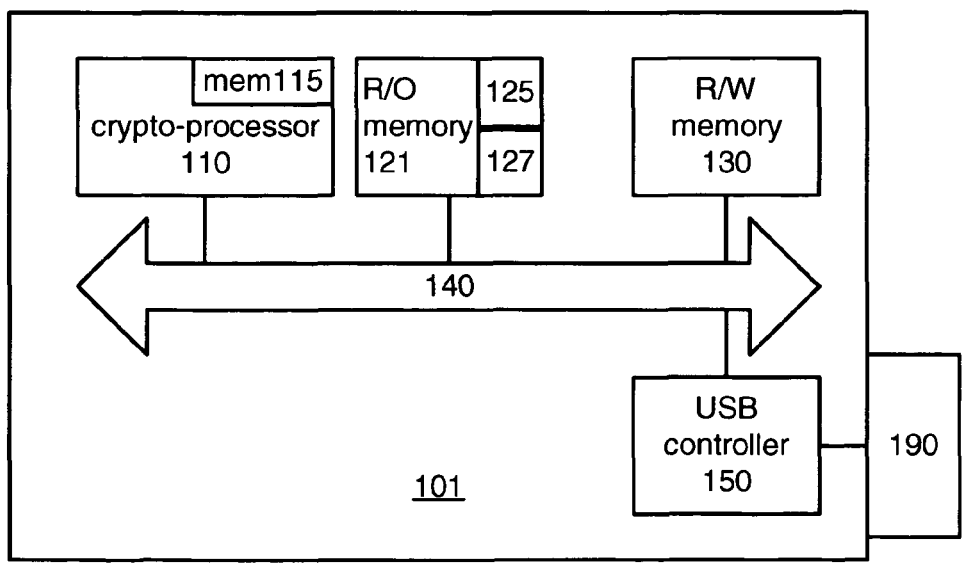

FIG. 3 is similar to FIG. 2, except that read-only memory 121 of portable device 101, which corresponds to read-only memory of portable device 100 in FIG. 2, additionally includes operating system program 127.

Read write memory 130 and controller 150 enable portable device 100 to serve as a conventional memory stick.

U.S. patent application Ser. No. 10/935,046, having common inventors herewith, is hereby incorporated by reference. This patent application discloses a controller computer that sets up a communication connection between a host computer and a remote computer. For example, the host computer may be a desktop computer connected to a corporate network that is connected to a communication network such as the Internet via a firewall, and the remote computer may be a personal digital assistant computer or portable computer. After a setup phase occurs, and in an operation phase, first, the remote device contacts the controller via a communication network such as the Internet, which sets up a connection between the remote device and the host computer, and second, thereafter the remote and host communicate directly in a manner that enables inputs to the remote to act like inputs at the host, and such that output displays from the host are displayed on the remote. In the event that the connection is lost, the controller assists in reestablishing the connection. The remote device may be in a hotel room, on a vehicle, and so on.

Portable device 100 eliminates the need for a traveling user to carry a personal digital assistant or notebook computer, or the like. Program 125 stored on portable device 100 enables the guest computer that device 100 is plugged into to serve as the remote device discussed in the '046 U.S. patent application.

In a setup phase, program 125 is loaded into read-only memory 120, along with an identification certificate for device 100, and an identification certificate for each host that device 100 is authorized to access. In another embodiment, program 125 is loaded into read-only memory 120 during its fabrication. The identification certificate and private key for device 100 are generated during setup by cryptographic processor 110. Generating the identification certificate and private key are examples of cryptographic processing.

Generally, the identification certificate and private key are generated using the PKCS#11 procedure, defining a technology-independent programming interface, called Cryptoki, for cryptographic devices such as smart cards and PCMCIA cards, and the PKCS#1 procedure, defining mechanisms for encrypting and signing data using the RSA public-key cryptosystem, available at www.rsasecurity.com/rsalabs/pkcs.

In one embodiment, to simplify association of the key for a remote with a host, device 100 is plugged into the host of the '046 patent application, eliminating the need for intermediate steps involved in setting up a secure path between the host and the remote, that is, device 100.

Figure 4:
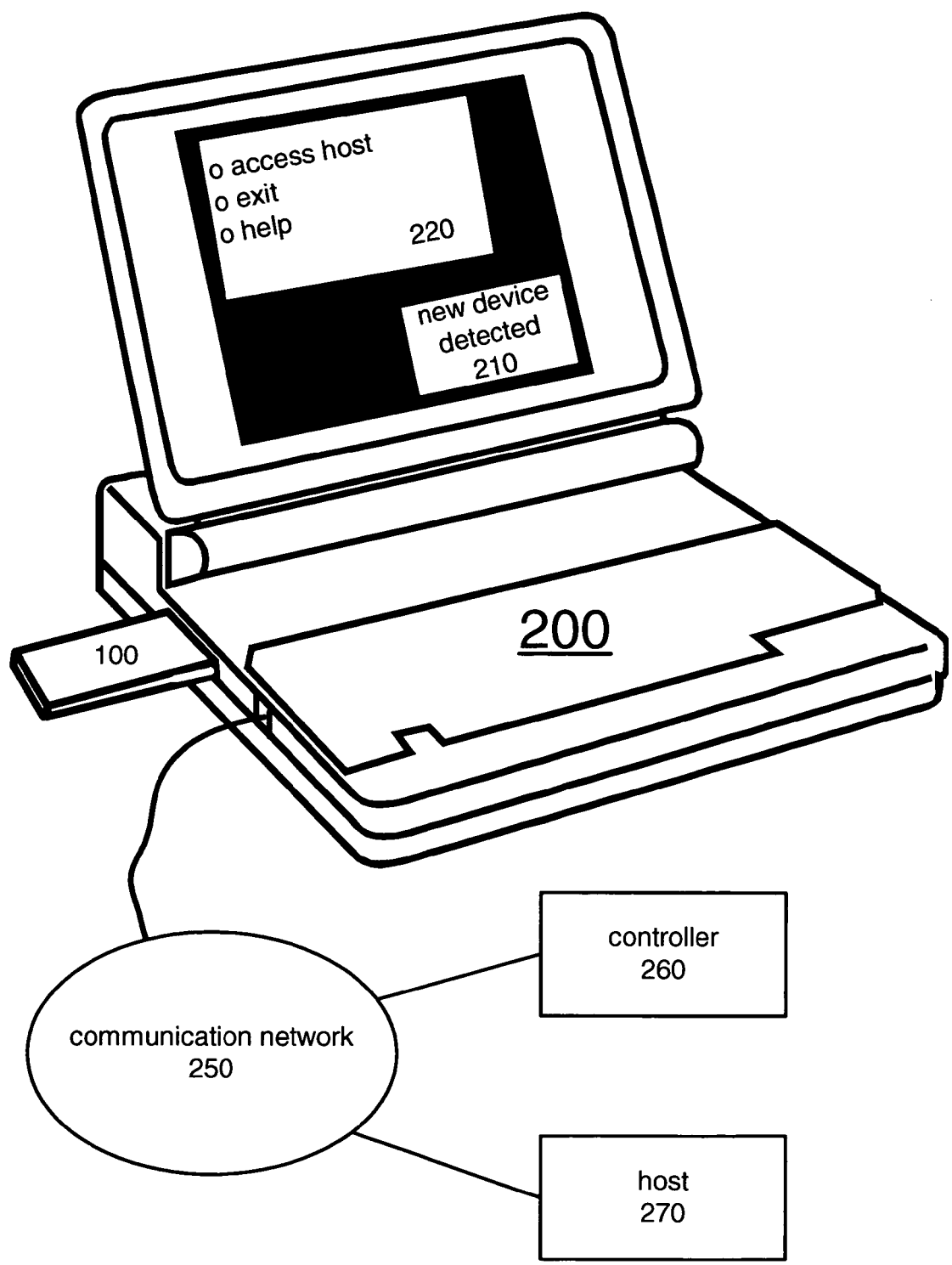
FIG. 4 is a diagram of a computer display in accordance with the present invention.

FIG. 4 shows personal computer 200 with device 100 inserted therein. Personal computer 200 is coupled to communication network 250 such as the Internet via dedicated or dial-up connection using a wireline or wireless connection. Personal computer 200 may be owned by the owner of device 100, or may be owned by someone else, such as a person that the owner of device 100 is visiting. Also coupled to communication network 250 are controller 260 and host 270, discussed in the '046 patent application.

In an operation phase, a user inserts device 100 into personal computer 200. The operating system, such as Microsoft Windows XP or Apple Panther, detects device 100 and generates alert window display 210 indicating that a new device has been found. Then, the operating system of computer 200 loads and executes program 125. If this is the first time that device 100 is used with computer 200, computer 200 may automatically load suitable drivers that are included in the operating system of computer 200 or are supplied from device 100. Then, or if device 100 has previously been used with computer 200, computer 200 automatically launches and executes program 125. In an alternate embodiment, computer 200 generates window display 220 providing a choice of executing the host access program on device 100, exiting from device 100 or obtaining help. In yet a different embodiment, the user manually launches program 125 from device 100.

If the exit option is selected, program 125 terminates and device 100 is usable as a conventional memory stick.

If the help option is selected, pre-stored information is provided, via either screens of information, an index or other suitable method.

If the access host option is selected, program 125 obtains access to host computer 270 by using the resources of its guest computer, that is, personal computer 200, to couple to communication network 250 and send appropriate messages (discussed below) to create a secure communication channel between device 100 and host computer 270. More specifically, program 125 causes computer 200 to initiate contact with controller 260, as described in the '046 patent application. Cryptographic processor 110 is used during the TLS transport layer security (TLS) handshake to establish a secure connection to controller 260 and host 270. In particular, as part of the TLS handshake, a random token is generated and digitally signed using the private crypto-key stored in device 100, and the other party (controller or host) uses the public crypto-key of device 100, available from the certificate of device 100 to decrypt the encrypted random token. The certificate of device 100 may be preinstalled on device 100, presented by the peer in the handshake, and/or obtained from an Internet certificate directory.

Figure 5:
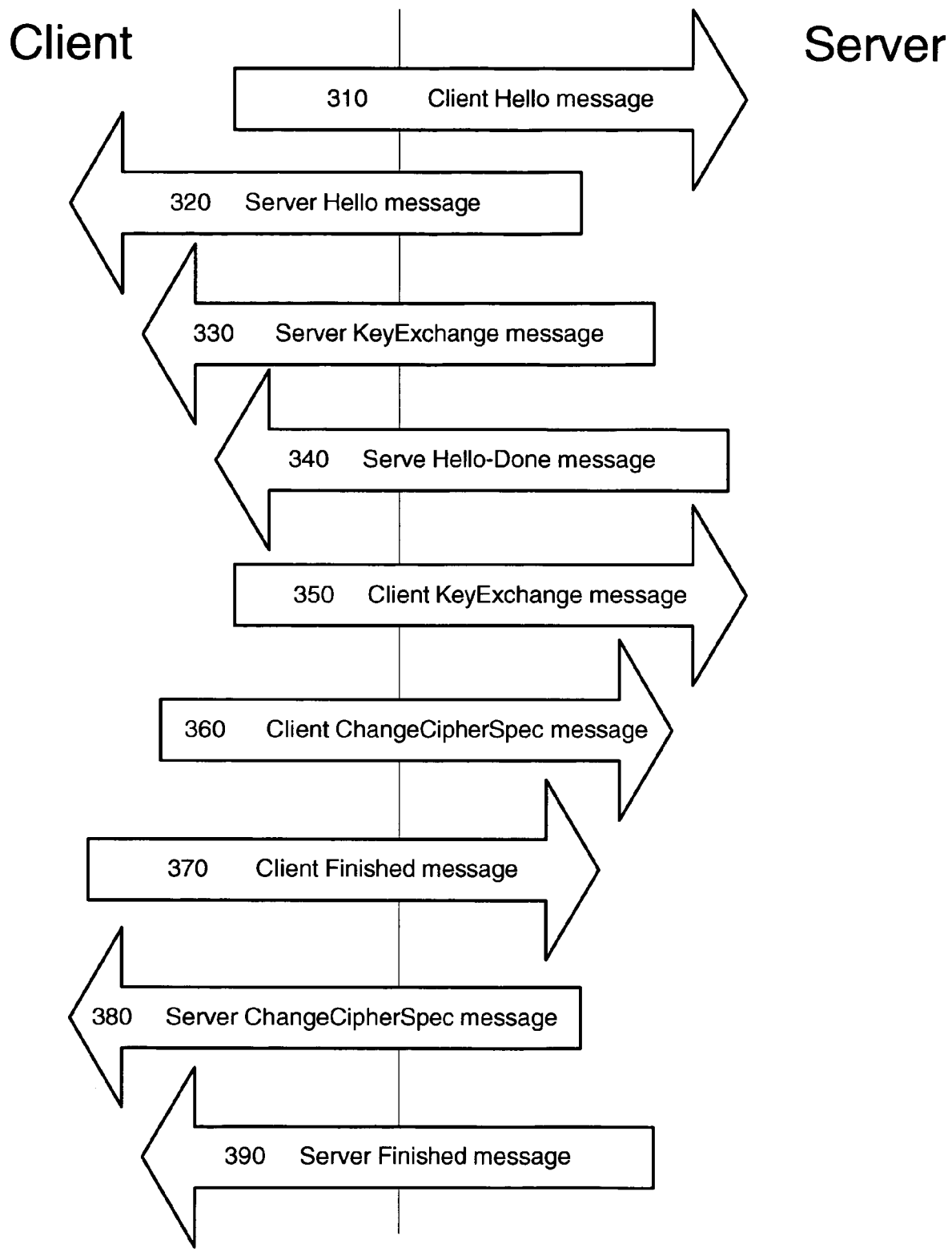
FIG. 5 is a chart depicting a TLS handshake.

Referring to FIG. 5, the TLS handshake procedure, in accordance with www.ietf.org/rfc/rfc2246.txt, is now described. Sending and receiving TLS handshake messages are examples of cryptographic processing. After describing the handshake procedure, the identity of the client and the identity of the server are discussed.

At step 310, the client sends a Client Hello message to the server, proposing SSL options.

At step 320, the server sends a Server Hello message to the client, selecting TLS options. At step 330, the server sends a Server KeyExchange message to the client, providing the server's public key information. At step 340, the server sends a Server Hello-Done message to the client, indicating completion of its portion of negotiating the communication channel.

At step 350, the client sends a Client KeyExchange message to the server, providing session key information, encrypted with the server's public key information. At step 360, the client sends a Client ChangeCipherSpec message to the server, to activate the negotiated options for all future message sent from the client. At step 370, the client sends a Client Finished message to the server, causing the server to enable the negotiated options.

At step 380, the server sends a Server ChangeCipherSpec message to the client, to activate the negotiated options for all future message sent from the server. At step 390, the server sends a Server Finished message to the client, causing the client to enable the negotiated options.

Subsequent transmissions between the client and the server are in encrypted form. Encrypting and decrypting the subsequent transmissions are examples of cryptographic processing.

The identity of the client and the identity of the server are now discussed.

As described in the '046 application, in a first phase, the host computer communicates with a controller, and the remote computer communicates with the controller; and then in a second phase, the controller provides the host computer and the remote computer with appropriate information so that the host computer and the remote computer thereafter communicate directly with each other.

During the first phase, the controller corresponds to the server in the above-described TLS handshake, and the remote computer, specifically the guest computer, personal computer 200, with device 100 installed, corresponds to the client in the above-described TLS handshake. Also, in a separate channel, the controller corresponds to the server in the above-described TLS handshake and the host computer corresponds to the client in the above-described TLS handshake.

During the second phase, the remote computer, specifically the guest computer, personal computer 200, with device 100 installed, corresponds to the server in the above-described TLS handshake, and the host computer corresponds to the client in the above-described TLS handshake.

During operation, the host computer may securely transfer a file to device 100 for secure storage thereon. Of course, the guest computer, that is, personal computer 200, may also transfer a file to device 100 for secure storage thereon.

In the embodiment of FIG. 3, in an operation phase, the user ensures that computer 200 is turned off, then inserts device 101 into an internal or external port of computer 200, then turns on power for computer 200. According to typical computer basic input output system (BIOS) operation, computer 200 when booting first tries to boot from any external devices connected thereto, detects operating system 127 such as Linux, and loads operating system 127. Thereafter, computer 200 executes program 125. To properly resume normal operation of computer 200, it is necessary to turn off computer 200, remove device 101, and reboot computer 200.

Figure 6:
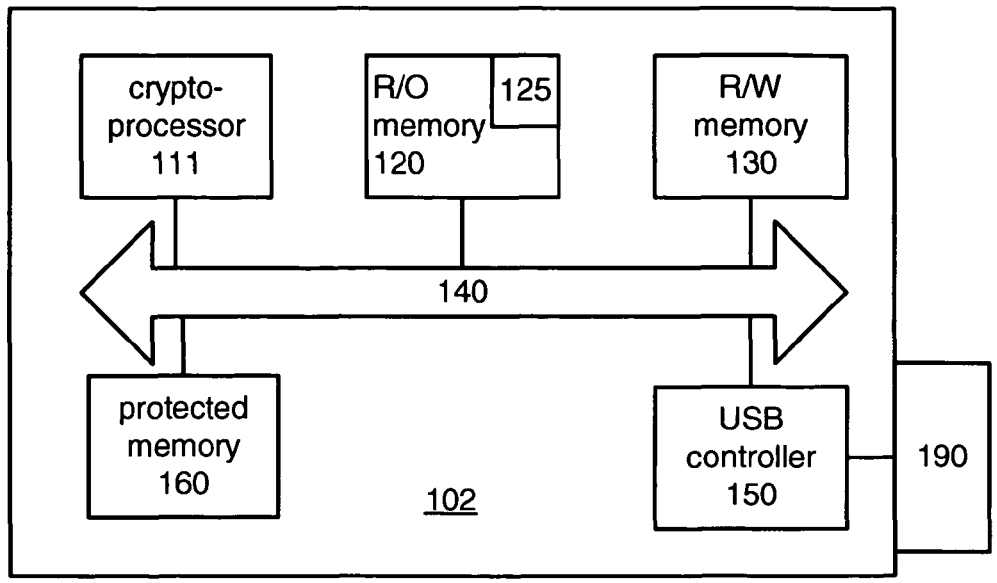
FIGS. 6 and 7 are diagrams of devices embodying the present invention.

FIG. 6 is similar to FIG. 2, except that portable device 102 includes protected memory 160 coupled to bus 140 and cryptographic processor 111 lacks an internal protected memory. Protected memory 160 is a flash-type memory that can be written only when a special administrator-write password is provided, typically, during registration, and the contents of protected memory 160 are read-protected with a secret user credential. Protected memory 160 serves to store a private crypto-key accessible only to cryptographic processor 111. Cryptographic processor 111 requires authentication with the secret user credential to access protected memory 160. This configuration is suitable when the cryptographic processor hardware being used does not have internal protected memory.

During a setup phase, the private crypto-key is written to memory 160.

During an operation phase, the private crypto-key is used during the TLS handshake, as described above.

Figure 7:
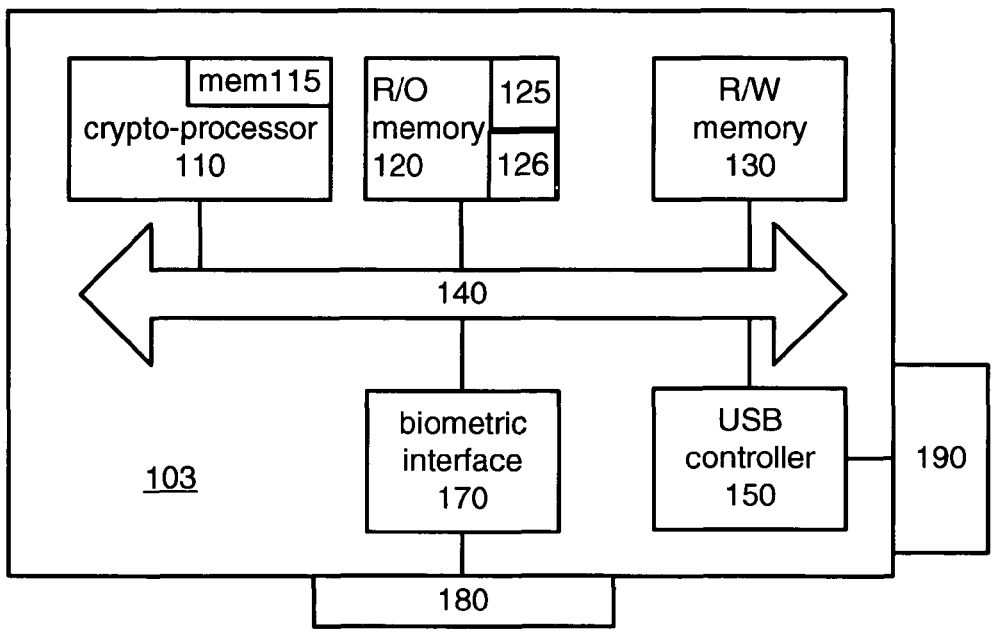

FIG. 7 is similar to FIG. 2, except that portable device 103 also includes biometric interface 170 coupled to bus 140, biometric program 126 stored in read-only memory 120, and biometric reader 180 coupled to biometric interface 170. Biometric reader 180 is a fingerprint reader; in other embodiments, biometric reader 180 is a signature scanner, iris scanner, microphone for voice input, or other biometric sensing device.

During a setup phase, in addition to the cryptographic activity described above, biometric program 126 is operative to prompt the user to provide biometric reference samples, such as fingerprint scans, and to associate the reference samples with the user.

During an operation phase, biometric program 126 is operative to control access to the functions of device 103 by requiring the user to provide a biometric sample and/or a password, and then compares the biometric sample with the biometric reference sample, to detect if the user is authorized. After the user is authenticated and authorized based on his or her biometrics, access to private cryptographic information stored in protected memory 115 is granted to cryptographic processor 110. After authentication and biometric authorization, operation proceeds as described above.

In other embodiments, combinations of the above-described embodiments exist, and variations of the hardware will be readily apparent. Although illustrative embodiments of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A portable device for enabling access to a host computer via a guest computer, comprising:
   a guest computer interface for connecting the portable device to the guest computer, and
   a memory for storing a program including instructions for establishing communication with the host computer such that input to the guest computer serves as input to the host computer, and output displays from the host computer are displayed on the guest computer, the program having instructions for
   (i) connecting the guest computer to a controller,
   (ii) sending a selection of the host computer from the guest computer to the controller,
   (iii) responding, at the guest computer, to a connection request from the host computer that was sent in response to a message from the controller, the message from the controller to the host computer being an instruction from the controller to establish a connection to the guest computer,
   (iv) sending a notice from the guest computer to the controller that a connection exists between the guest computer and the host computer, and
   (v) after sending the notice, sending input from the guest computer to the host computer without assistance from and without resources of the controller.

2. The portable device of claim 1, wherein the guest computer interface includes a USB connector and a USB controller.

3. The portable device of claim 1, wherein the guest computer interface includes a MMC connector and a MMC controller.

4. The portable device of claim 1, wherein the memory is also for storing an operating system.

5. The portable device of claim 1, wherein the memory is a read-only memory.

6. The portable device of claim 5, further comprising a second memory for storing information received via the guest computer interface.

7. The portable device of claim 1, further comprising a cryptographic processor for performing cryptographic processing for communicating with the host computer.

8. The portable device of claim 7, wherein the cryptographic processing includes generating an identification certificate and a private key.

9. The portable device of claim 7, wherein the cryptographic processing includes sending and receiving handshake messages.

10. The portable device of claim 7, wherein the cryptographic processing includes encrypting and decrypting transmissions between the guest computer and the host computer.

11. The portable device of claim 7, further comprising a protected memory for storing a private key accessible to the cryptographic processor, the private key being used during cryptographic processing.

12. The portable device of claim 11, wherein the cryptographic processor provides a credential to the protected memory to access its contents.

13. The portable device of claim 11, wherein the protected memory is internal to the cryptographic processor.

14. The portable device of claim 11, wherein the protected memory is external to the cryptographic processor.

15. The portable device of claim 7, further comprising biometric input means for receiving a biometric sample from a user, biometric authentication means for determining whether the biometric sample is for an authorized user, and wherein the cryptographic processor is operative only when the biometric authentication means has determined that the biometric sample is for an authorized user.

16. A method of using a portable device for enabling access to a host computer via a guest computer, comprising:
  connecting the portable device to the guest computer, and
  activating a program stored in a memory on the portable device, the program including instructions for establishing communication with the host computer such that input to the guest computer serves as input to the host computer, and output displays from the host computer are displayed on the guest computer, the program having instructions for
    (i) connecting the guest computer to a controller,
    (ii) sending a selection of the host computer from the guest computer to the controller,
    (iii) responding, at the guest computer, to a connection request from the host computer that was sent in response to a message from the controller, the message from the controller being sent to the guest computer in response to an instruction from the controller to establish a connection to the guest computer,
    (iv) sending a notice from the guest computer to the controller that a connection exists between the guest computer and the host computer, and
    (v) after sending the notice, sending input from the guest computer to the host computer without assistance from and without resources of the controller.

17. The method of claim 16, wherein the portable device includes a cryptographic processor for performing cryptographic processing for communicating with the host computer.

18. The method of claim 17, wherein the portable device includes a protected memory for storing a private key accessible to the cryptographic processor, the private key being used during cryptographic processing.

19. The method of claim 17, wherein the portable device includes biometric input means for receiving a biometric sample from a user, biometric authentication means for determining whether the biometric sample is for an authorized user, and wherein the cryptographic processor is operative only when the biometric authentication means has determined that the biometric sample is for an authorized user.

20. A system for enabling remote access, comprising:
  a host computer for communicating via a communication network,
  a controller for communicating via the communication network,
  a guest computer for communicating via the communication network, and
  a portable device having a guest computer interface for connecting the portable device to the guest computer, and a memory for storing a program including instructions for establishing communication with the host computer such that input to the guest computer serves as input to the host computer, and output displays from the host computer are displayed on the guest computer, the program having instructions for
    (i) connecting the guest computer to a controller,
    (ii) sending a selection of the host computer from the guest computer to the controller,
    (iii) responding, at the guest computer, to a connection request from the host computer that was sent in response to a message from the controller, the message from the controller to the host computer being an instruction from the controller to establish a connection to the guest computer,
    (iv) sending a notice from the guest computer to the controller that a connection exists between the guest computer and the host computer, and
    (v) after sending the notice, sending input from the guest computer to the host computer without assistance from and without resources of the controller.

* * * * *